Sept. 22, 1925. Re. 16,174

P. B. NEWKIRK

MOTOR VEHICLE TRANSMISSION MECHANISM

Original Filed March 4, 1922 4 Sheets-Sheet 1

Inventor
PERRY B. NEWKIRK.

Eugene E. Brown
Attorney

Sept. 22, 1925. Re. 16,174
P. B. NEWKIRK
MOTOR VEHICLE TRANSMISSION MECHANISM
Original Filed March 4, 1922 4 Sheets-Sheet 2
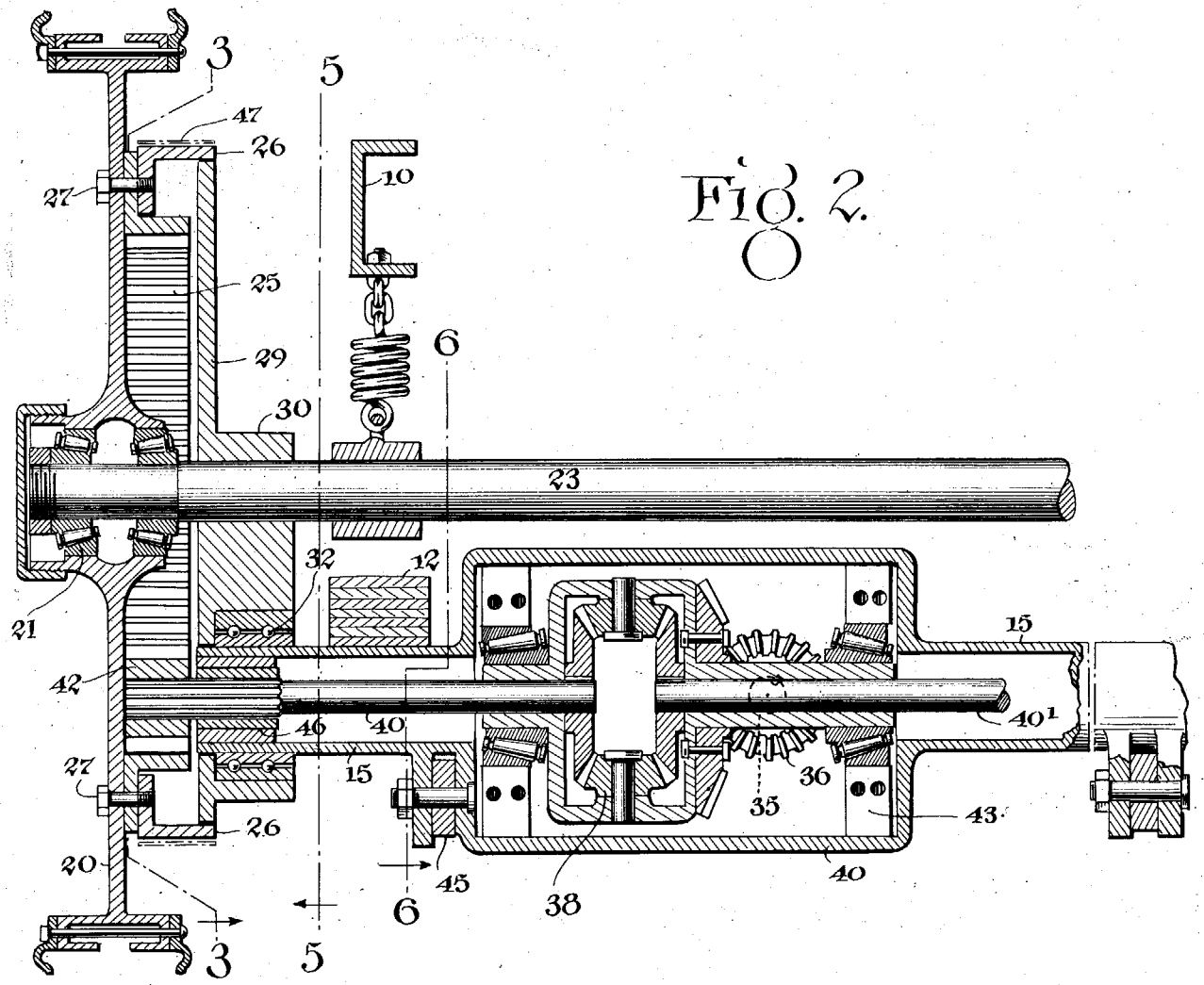
Inventor
PERRY B. NEWKIRK.
Eugene C. Brown
Attorney Sept. 22, 1925. Re. 16,174

P. B. NEWKIRK

MOTOR VEHICLE TRANSMISSION MECHANISM

Original Filed March 4, 1922 4 Sheets-Sheet 3

Inventor
PERRY B. NEWKIRK.

Eugene C. Brown
Attorney

Sept. 22, 1925.

Re. 16,174

P. B. NEWKIRK

MOTOR VEHICLE TRANSMISSION MECHANISM

Original Filed March 4, 1922 4 Sheets-Sheet 4

Inventor
PERRY B. NEWKIRK.

Eugene C. Brown
Attorney

Reissued Sept. 22, 1925.

Re. 16,174

UNITED STATES PATENT OFFICE.

PERRY B. NEWKIRK, OF SEATTLE, WASHINGTON, ASSIGNOR, BY MESNE ASSIGNMENTS, TO ELMER H. SCHWARZ, TRUSTEE, OF FORT LEE, NEW JERSEY.

MOTOR-VEHICLE TRANSMISSION MECHANISM.

Original No. 1,417,406, dated May 23, 1922, Serial No. 540,950, filed March 4, 1922. Application for reissue filed July 3, 1922. Serial No. 572,747.

*To all whom it may concern:*

Be it known that I, PERRY B. NEWKIRK, a citizen of the United States, residing at Seattle, in the county of King and State of Washington, have invented certain new and useful Improvements in Motor-Vehicle Transmission Mechanism, of which the following is a specification.

My invention relates to improvements in drive mechanism for vehicles and has for its main purpose the provision of means associated with the modern type of motor vehicle whereby the weight of the vehicle body, together with its load, is utilized to assist in the forward or rearward turning of the traction wheels when an obstacle or uneven road surface is encountered.

The mechanical principle involved has long been known and various attempts have been made to utilize it in the propulsion of vehicles employing chain and sprocket drive but in so far as I am aware, prior to my invention no one has devised means whereby this principle could be employed in connection with driving or live axles completely enclosed within a housing. The enclosed driving axle with its differential gear connection to the drive-shaft has so many advantages over all other types, such as the chain drive, that it has rendered all others practically obsolete.

A motor-truck embodying my invention is particularly advantageous when pulling a heavy load or when the machine is mired, since the weight and driving power are then automatically thrown forward of the center of the wheels, and the weight is first gradually lifted and then added to the tractive or rolling effort of the engine to carry the vehicle out of a rut or over an obstruction. In effect, therefore, this gives an additional leverage to the driving power of the machine to turn the wheels.

Figure 1:
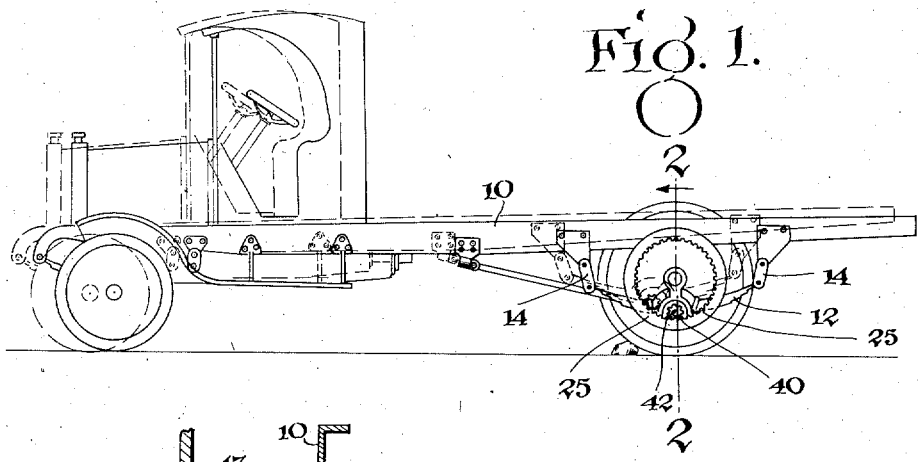
Figure 7:
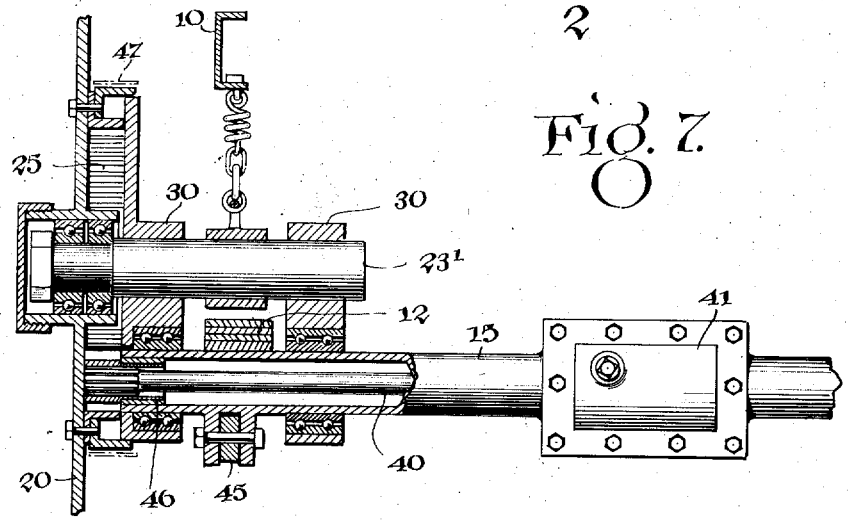
Figure 8:
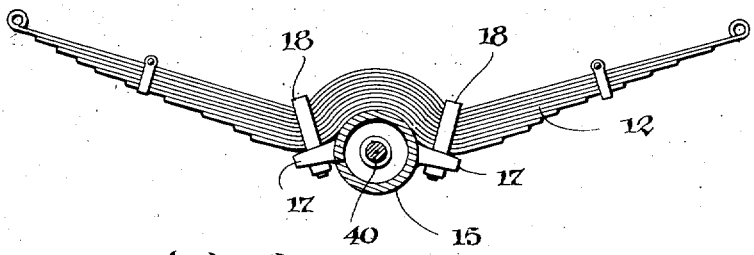
Figure 3:
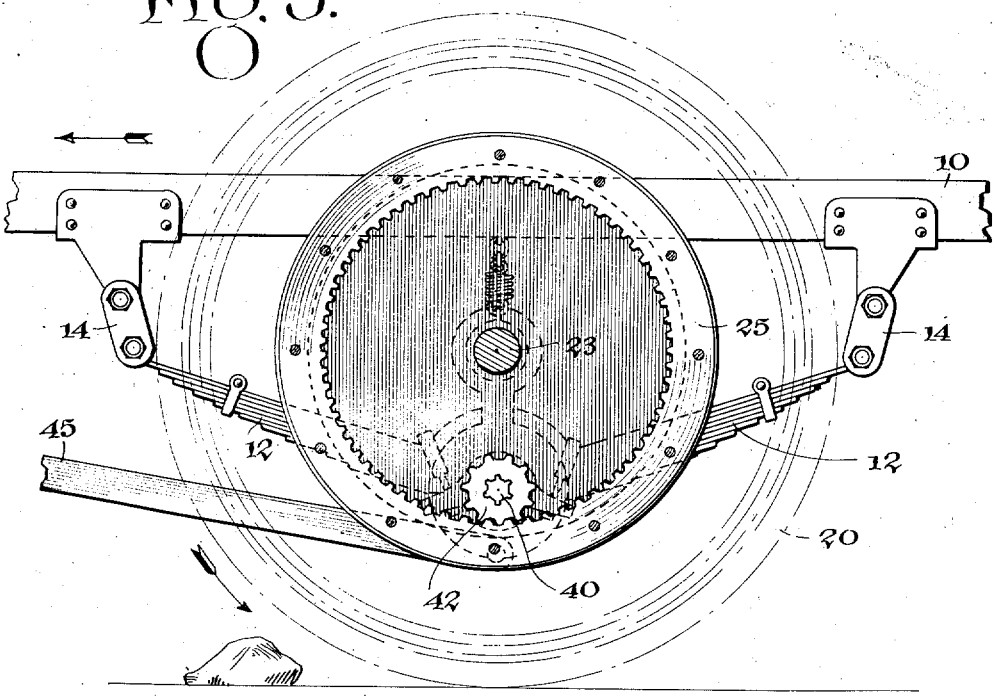
Figure 5:
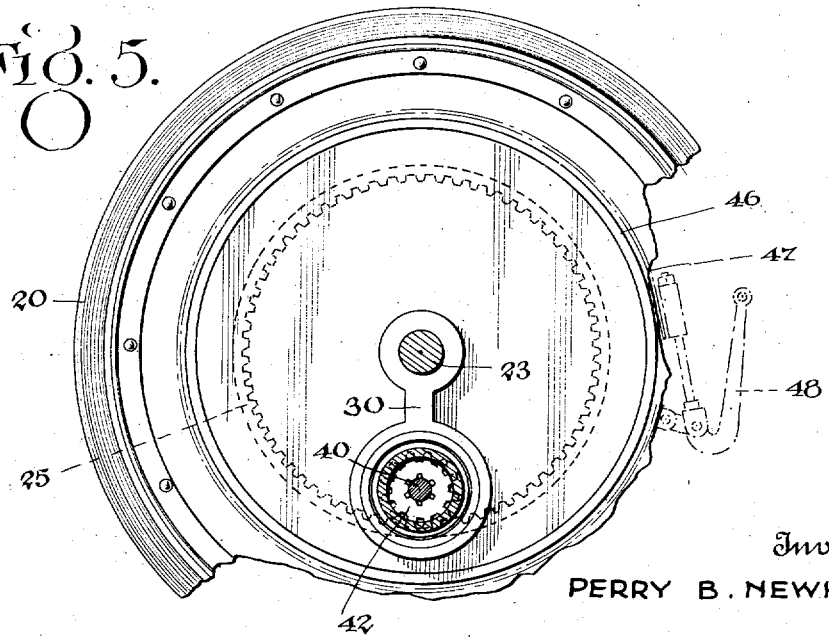
Figure 4:
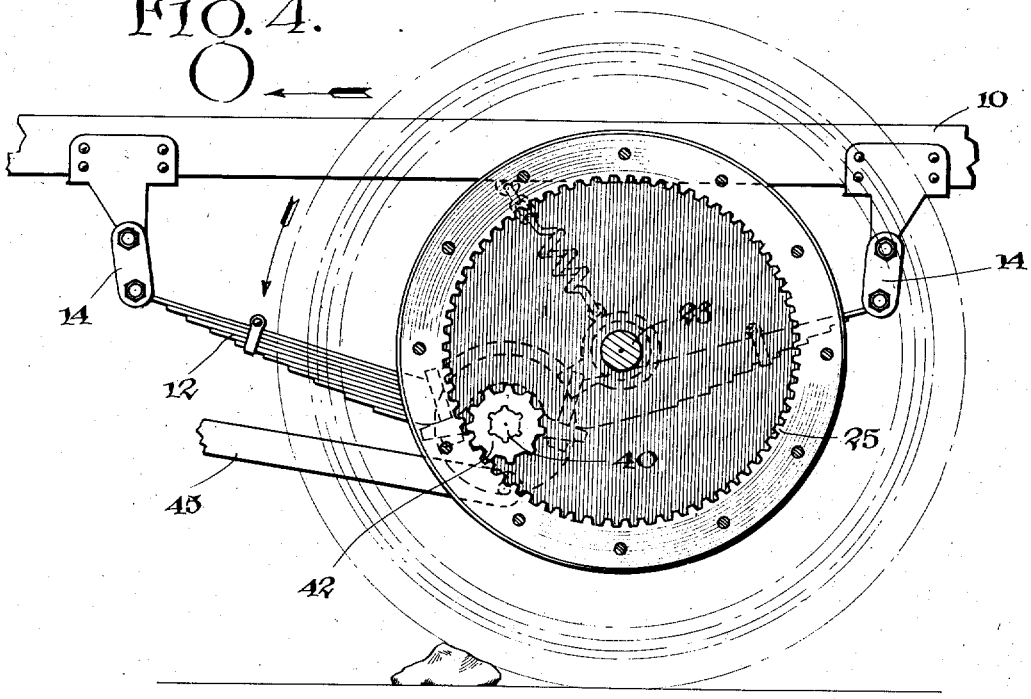
Figure 6:
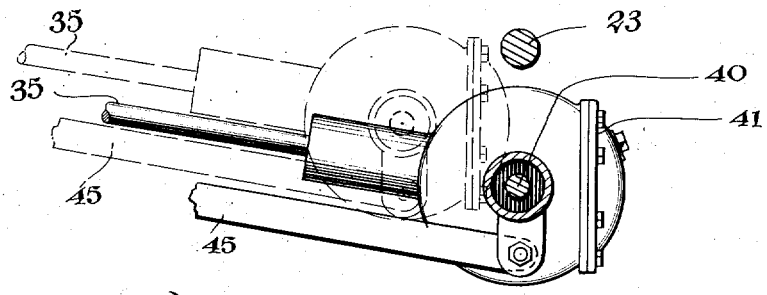

In the following description I shall refer to the accompanying drawings, in which—Figure 1 is a side elevation of a motor truck equipped with my driving mechanism; Fig. 2 is a partial transverse vertical sectional view on the line 2—2 of Fig. 1; Fig. 3 is a sectional view on the line 3—3 of Fig. 2; Fig. 4 is a similar view showing the relative movement of the live axle and vehicle body with respect to the dead axle and wheels when an obstacle is encountered; Fig. 5 is a sectional view on the line 5—5 of Fig. 2; Fig. 6 is a sectional view on the line 6—6 of Fig. 2; Fig. 7 is a partial longitudinal view, partly in section, of a modified arrangement of the driving axle; and Fig. 8 is a detail view of one of the main springs showing its connection with the live axle housing.

The rear end of frame 10 of the truck body or chassis is supported upon the main springs 12, preferably by means of shackles 14, and the springs are rigidly secured at their centers to the live axle housing 15, so that the latter is prevented from any turning movement and maintains the same axial position at all times with relation to the vehicle body. The importance of this feature will be pointed out hereinafter. In Fig. 8 I have illustrated a form of spring and the manner of attaching it to the axle housing which I have devised for use in connection with my transmission mechanism. Each leaf of the spring 12, is bowed or arched at the center to form a seat for the axle housing 15, and the latter is provided with lugs 17 projecting upon opposite sides at the proper angle to form bearing supports for the spring which is rigidly secured by inverted U-bolts 18 which pass through apertures in the lugs.

The traction wheels 20 are mounted upon bearings 21 carried upon either end of the dead axle 23, the internal gear ring 25 and brake drum 26 being secured to the web of the wheel by bolts 27. The inner side of the brake drum is closed by a plate 29 which may be integral with the hanger 30 freely mounted upon the dead axle 23 and which carries the bearings 32 for the ends of the live axle housing. The weight of the truck body which is supported by the springs upon the axle housing 15 is thus transferred through the hanger 30 to the dead axle 23 to which the traction wheels are secured.

The transmission of power from the engine through the power shaft 35 and its driving pinion 36 and through the differential transmission 38 to the jack-shafts 40 and 40′ carrying pinions 42 at their outer ends which mesh with the internal gears 25 upon the traction wheels will be understood by engineers and those familiar with motor vehicles without further explanation. It will be noted that the transmission gearing may be removed en bloc from its housing 40 after the traction wheels have been removed to allow the jack-shafts to be slid outwardly. It is merely necessary then to take off the cover plate 41 and remove the outer sections of the bearing boxes from the inner sections 43 to which they are bolted, the latter being made fast to the housing 40. The live shaft housing 15 is braced in the usual manner by means of radius rods 45.

The outer ends of the live axles pass through suitable bearings 46 in the outer ends of the housings 15. An important feature in my improved axle is the manner in which the power transmitting members are connected to the load-sustaining or dead axle member so that the entire axle is a unit and all strains and loads imposed upon the several members are properly taken care of, at the same time relieving the live axle members of the load-sustaining strains and the deflection and vibration resulting therefrom.

The operation of my improved axle construction will be understood from the foregoing description of the structural parts. When the vehicle is standing still or is pulling a light load over a good road, the hangers 30 will depend vertically and the driving pinions 42 will be in the position indicated in Fig. 3 directly below the dead axle 23. If, however, a hill is reached or the tractor enters a rough and muddy road or encounters an obstruction, the traction wheels will immediately be retarded, resulting in a relative movement between the parts, the power transmitted from the engine causing the pinions 42 to gradually move forward and upward over the teeth of the internal gear 25 which constitutes a rack for the pinion, due to its retarded movement and as a result the entire weight of the truck body and its load are moved forwardly and upwardly with respect to the dead axle to a position such as indicated in Fig. 4 and in dotted lines in Fig. 1. This forward and upward movement may continue until the springs 12 engage the underside of the dead axle. The weight has thus been moved forwardly with respect to the obstacle and tends to assist by this advantageous position in moving the truck over the obstruction. Again, the weight of the truck and its load which have been transferred to the pinions 42 by reason of the upward swinging of the supports 30 about the dead axle, tends to cause the pinions to move downwardly again over the teeth of the internal gear and this movement is in the proper direction to assist the motive power in rolling the wheels over the obstruction. This action of the weight of the load in assisting to cause the wheels to climb out of the rut or rise over the obstruction, as the case may be, may be likened to the action of the parts of a treadmill in which the weight is applied forward of the center of the mill. It is evident therefore, that whenever the rear wheels resist turning movement by reason of some exterior resistance, the turning moment devolving upon the same will be increased by the shifting of the weight of the vehicle to the new position just referred to. Such new position will be largely governed by the amount of the resistance, so that a proportionate degree of power will be added.

From a consideration of the actions and reactions which take place as above described, it is evident that a sudden application of the brake lever 48, causing the brake band 47 to grip the brake drum and suddenly retard the movement of the traction wheels will likewise cause the driving pinions 42 to climb upwardly along the teeth of the internal gear ring 25 and in so doing the power of the engine will be absorbed in lifting the truck body and its load, thus relieving the machine of any sudden torque or hammer blows. No part of the driving mechanism of the motor, clutch, transmission, universal joint, differential or driving gears can receive a sudden torque strain. With the motor idling and the truck in gear, the clutch may be suddenly applied without stalling the motor and without danger of stripping the gears. As a result of this almost complete absorption of shocks, trucks provided with solid tires are subject to less vibration than ordinary trucks equipped with pneumatic tires. Furthermore, on account of the yielding movement permitted to the load, slippage of the tires on the road is practically eliminated. Owing to this fact and because of the elimination of the usual twisting movement in starting, the life of tires has been found to be practically doubled. Again, owing to the extraordinary flexibility of this axle construction, the vehicle is relieved of more than 90% of road vibration which reduces the crystallization of all working parts of the vehicle to a minimum.

A very important feature of my invention resides in the arrangement of parts by which I am enabled to employ the usual power transmission through differential gearing and live axles which are completely enclosed in a housing and may thus be thoroughly lubricated or run in oil. It is evident that there must be no relative change in position between the differential transmission and the drive shaft when the live shaft swings to one side or the other of the dead axle and the supports 30 are shifting to varying oblique angles, since this would cause destructive and prohibitive torsional strains. I have overcome the difficulties in this regard and am enabled to embody the heretofore known mechanical principles involved in this axle construction by rigidly maintaining the axle and transmission housing in fixed relation to the driving power and in alignment with the truck body. I accomplish this purpose by securing the live axle housing rigidly to the central part of the main springs, so that while the housing moves forwardly or backwardly and up or down with the truck body, it is held absolutely fixed in its relative position thereto and is mounted in bearings in the hangers so that it does not partake of any rotary or axial movement as the hangers swing about the dead axle.

I have described in detail the particular construction illustrated in the accompanying drawings for the purpose of clearly disclosing an embodiment of my invention, but it will be evident to engineers that various changes and modifications may be made without departing from my invention.

I have shown in Fig. 7 that stub-axles 23′ may be substituted for the single dead axle which may be desirable when a truck with a low body is used. In this case an additional swinging support 30 between the live and dead axles is employed.

I claim:—

1. Transmission mechanism for motor vehicle, comprising a dead axle having an end bearing, a traction wheel thereon having a concentric gear, a live axle or jack shaft provided with a pinion in mesh with said gear, a housing having bearings in which said live axle is mounted, a swinging mounting journaled at its opposite ends upon said dead axle and said housing respectively, and a vehicle support rigidly secured to said housing, whereby the latter is maintained in parallel relation with the vehicle body but may move in an arcuate path with respect to said dead axle.

2. A driving axle construction for motor-vehicles comprising a dead axle having end bearings, traction wheels mounted thereon, each having concentric gears, a jack shaft carrying pinions in mesh with said gears, a jack shaft housing having bearings in which said jack shaft is mounted, a swinging mounting between said axle and said housing rotatably carrying the housing, thereby permitting the latter to move in an arcuate path upon opposite sides of axle, and a vehicle body mounted upon and secured to said housing, whereby the latter is maintained in parallel relation to said body.

3. A driving axle construction for motor-vehicles, comprising a dead axle having end bearings, traction wheels mounted thereon, each having concentric gears, a jack shaft carrying pinions in mesh with said gears, a housing having bearings in which said jack shaft is mounted, a swinging mounting between said axle and said housing rotatably carrying the housing, thereby permitting the latter to move in an arcuate path upon opposite sides of axle, vehicle springs rigidly secured to said housing, and a vehicle body mounted upon said springs.

4. A driving axle construction for motor-vehicles, comprising a dead axle having end bearings, traction wheels mounted thereon, each having concentric gears, a jack shaft carrying pinions at each end in mesh with said gears, and having differential gearing connected to the vehicle drive shaft, a housing having bearings in which said jack shaft is mounted, a swinging mounting between said axle and said housing rotatably carrying the housing, thereby permitting the latter to move in an arcuate path upon opposite sides of axle, and a vehicle body mounted upon and secured to said housing, whereby the latter is maintained in parallel relation to said body.

5. A driving axle construction for motor-vehicles, comprising a dead axle having end bearings, traction wheels mounted thereon, each having concentric gears, a jack shaft carrying pinions in mesh with said gears, a housing having bearings in which said jack shaft is mounted, a swinging mounting between said axle and said housing rotatably carrying the housing, thereby permitting the latter to move in an arcuate path upon opposite sides of axle, and means for maintaining the housing parallel to the vehicle body.

6. A driving axle construction for motor-vehicles, comprising a dead axle having end bearings, traction wheels mounted thereon, each having concentric gears, a jack shaft carrying pinions at each end in mesh with said gears, and having differential gearing connected to the vehicle drive shaft, a housing having bearings in which said jack shaft is mounted, a swinging mounting between said axle and said housing rotatably carrying the housing, thereby permitting the latter to move in an arcuate path upon opposite sides of axle, and means for maintaining the housing parallel to the vehicle body.

7. A driving axle construction for motor vehicles, comprising a dead axle, a traction wheel mounted thereon having a concentric driven element, a jack or drive shaft carrying a driving element in operative relation thereto, a housing in which said jack shaft is mounted, a mounting between the axle and said shaft rotatably carrying said shaft and concentrically oscillatable about the axis of the wheel upon either side thereof and means for maintaining the housing parallel to the vehicle body.

8. A driving axle construction for motor vehicles, comprising a dead axle having end bearings, traction wheels mounted thereon, each having concentric gears, a jack shaft carrying pinions in mesh with said gears, a housing in which said jack shaft is rotatably mounted, a mounting between the axle and said housing rotatably carrying the latter and concentrically oscillatable about the axis of the traction wheels upon either side thereof, thereby permitting said housing to move in an arcuate path upon opposite sides of the axle.

In testimony whereof, I affix my signature.

PERRY B. NEWKIRK.